United States Patent [19]

Yanagawa

[11] 3,904,285

[45] Sept. 9, 1975

[54] MICROREADER HAVING AN AUTOMATIC CARD SELECTION AND RETRIEVAL APPARATUS

[75] Inventor: Nobuyuki Yanagawa, Oi-Yamada, Japan

[73] Assignee: Ricoh Co., Ltd., Tokyo, Japan

[22] Filed: July 27, 1973

[21] Appl. No.: 383,159

[30] Foreign Application Priority Data

July 31, 1972 Japan ................................ 47-75887

[52] U.S. Cl. ....................... 353/27; 353/78; 353/87; 353/101

[51] Int. Cl. ....................... G03b 23/08; G03b 21/28

[58] Field of Search ................................ 353/25–27, 353/74–78, 87, 101

[56] References Cited

UNITED STATES PATENTS

| | | | |
|---|---|---|---|
| 3,743,400 | 7/1973 | Haming | 353/27 |
| 3,754,817 | 8/1973 | Iida | 353/27 |

FOREIGN PATENTS OR APPLICATIONS

| | | | |
|---|---|---|---|
| 1,347,044 | 11/1963 | France | 353/27 |
| 316,668 | 11/1930 | United Kingdom | 353/26 |
| 1,213,525 | 11/1970 | United Kingdom | 353/27 |

*Primary Examiner*—Richard E. Aegerter
*Assistant Examiner*—A. J. Mirabito
*Attorney, Agent, or Firm*—Cooper, Dunham, Clark, Griffin & Moran

[57] ABSTRACT

A microreader having a projection screen and a card selection and retrieval apparatus for information cards each having, along a side thereof, a magnetic portion and coding bit positions at least a subset of which are represented by notches in that side of the card. A card selector unit selects a desired card from a card cassette, a card moving unit moves the selected card to a desired projection position, and then a light source and a mirror unit are moved to a position with respect to the selected card for projected a desired frame of the card on the screen. An operator of the microreader sets knobs to indicate the number of the desired card, and sets additional knobs to indicate the desired frame of that card; the rest is done automatically by the invented microreader.

5 Claims, 19 Drawing Figures

MICROREADER HAVING AN AUTOMATIC CARD SELECTION AND RETRIEVAL APPARATUS

BACKGROUND AND SUMMARY OF THE INVENTION

The invention is in the field of microreaders and relates specifically to microreaders provided with automatic card selection and retrieval devices.

Microfilm and microfiche storage media are widely used for compact storage of large amounts of information. When the microfilm or microfiche records are in the form of cards, with each card containing a number of frames, it is desirable that it be possible to store the cards in an arbitrary sequence, so that it would not be necessary to file cards in predetermined places after using the cards. It is also desirable that it be possible to have an operator simply indicate the number of a desired card, without necessarily knowing the location of the desired card, and have the microreader locate and retrieve the desired card.

The subject invention is directed to a card selection and retrieval apparatus for a microreader, which allows an operator set, e.g., by means of dials, the number of a desired card and a desired frame from that card, and locates the desired card and moves it to a position at which the desired frame of that card is projected on a suitable screen. In a specific embodiment of the invention, a card selector unit includes a card cassette moving tray supporting a card cassette that stores cards in a random sequence. One side of each of the cards sticks out of the cassette, and that side has a magnetic portion and a number of coding bit positions at least some of which are represented by notches in the exposed side of the card. The card selector unit includes a withdrawal magnet and a number of selector bars which are aligned with the coding bit positions of the card. The card cassette is moved with respect to the withdrawal magnet, and the selector bars are set through the operator dials such that only a selected card is allowed to ride along a surface of the magnet which slants away from the path of the card cassette, while all other cards continue moving with the cassette. The selected card, which is partly withdrawn from the cassette by the magnet, is gripped by a card guide, and the card guide is moved, together with the selected card gripped thereby, to a projection position selected by operator dials. A combination of a light source and a mirror unit is moved with respect to the projection position of the selected card according to the setting of the operator dials in order to project a selected frame from the selected card onto a screen. Provisions are made for selectively focusing the projected image and for selectively slanting the projected image.

The specific means for carrying out the functions described above include novel aspects that contribute to the simplicity and reliability of the invented microreader.

Figure 1:
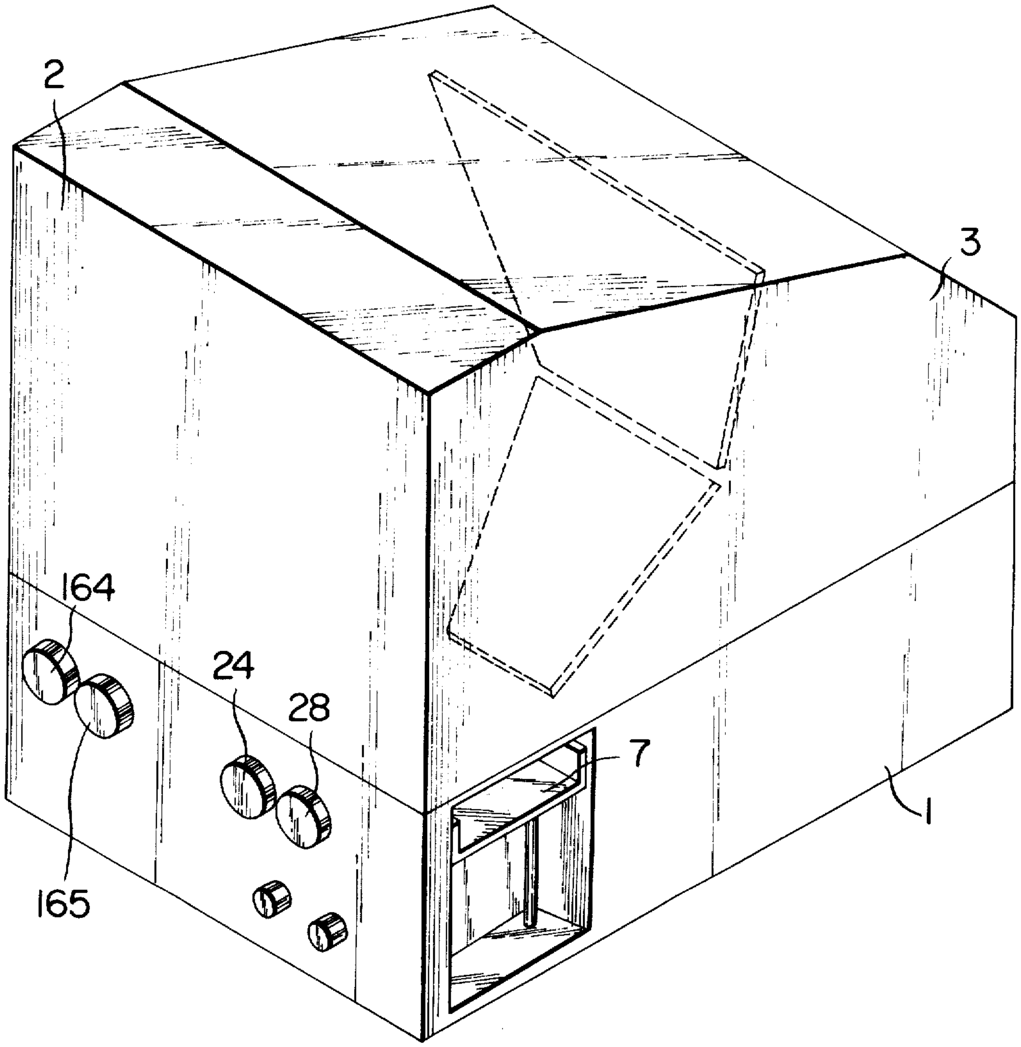
FIG. 1 is a perspective view of a microreader according to the invention.

DETAILED DESCRIPTION 1, a FIG. 1,a microreader according to the invention is shown as comprising a casing 1 in which a selector unit A and a condenser unit C are mounted, and a casing 3 mounting a mirror unit therein and provided with a screen 2 disposed in the front thereof. The two casings 1 and 3 are detachably interconnected.

Figure 2:
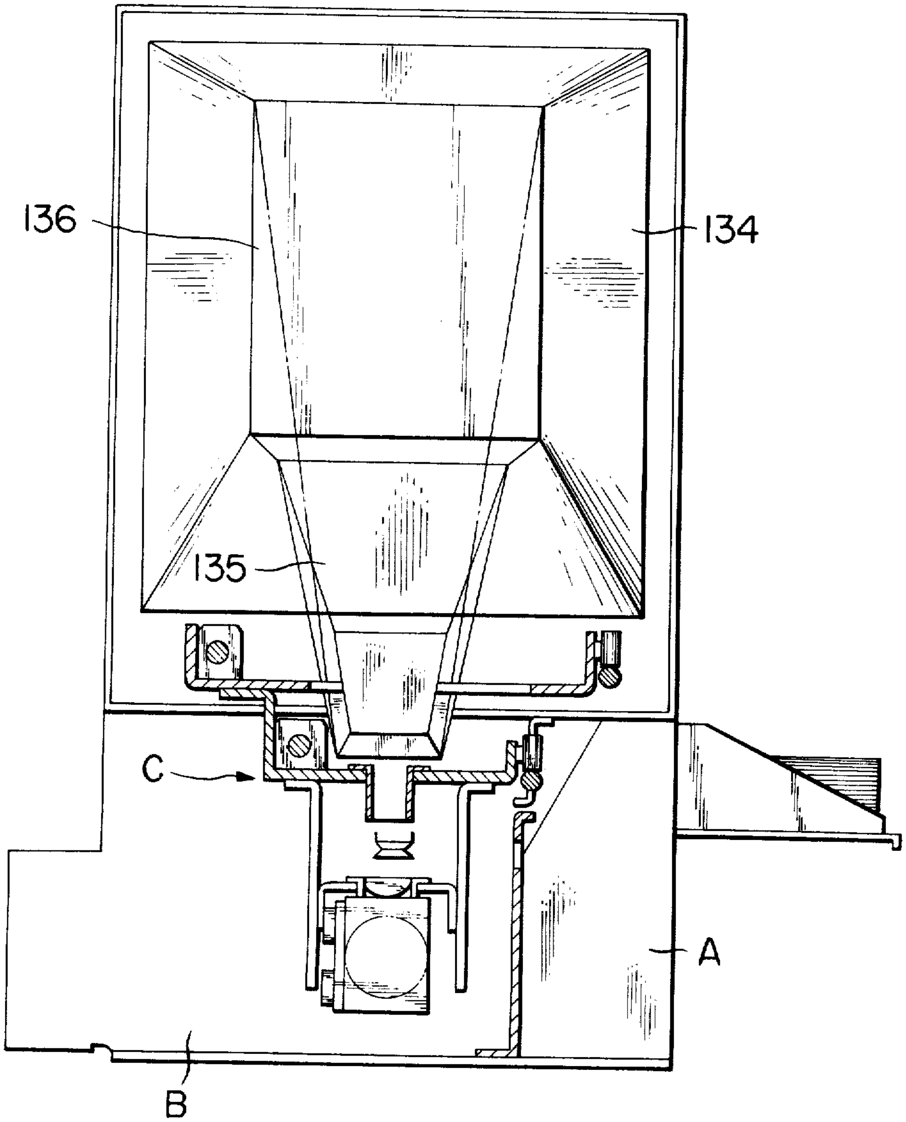
FIG. 2 is a side view of the microreader shown in FIG. 1, showing the arrangement of various units thereof.

In FIG. 2, the selector unit A, a card moving unit B, and the condenser unit C are arranged in the casing 1 in predetermined relative positions. More specifically, the selector unit A and card moving unit B are arranged in side-by-side relationship at the right and left sides of the casing 1 respectively, while the condenser unit C is disposed above the card moving unit B.

Figure 3:
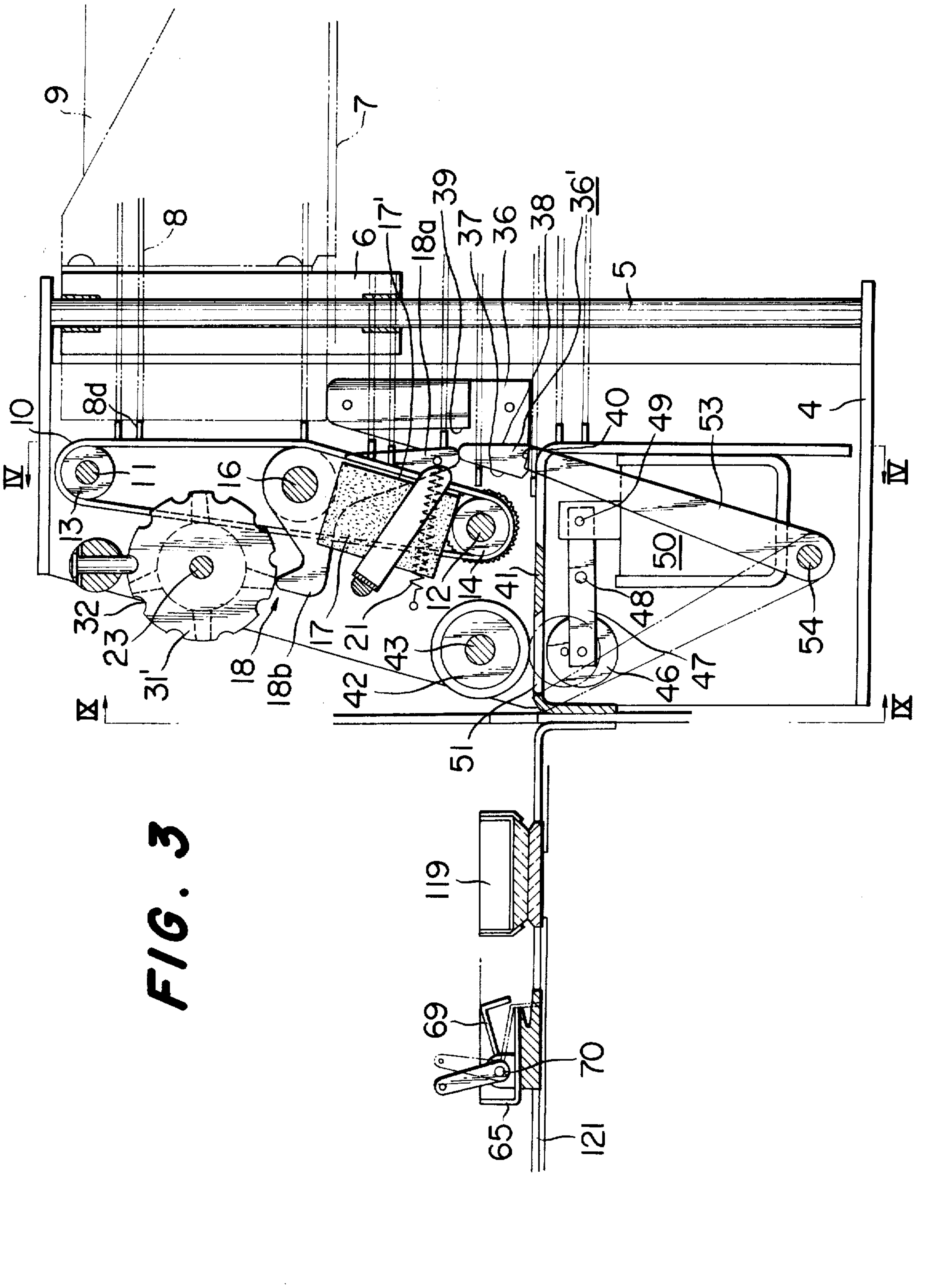
FIG. 3 is a vertical sectional view of a selector unit forming a part of the microreader.
Figure 4:
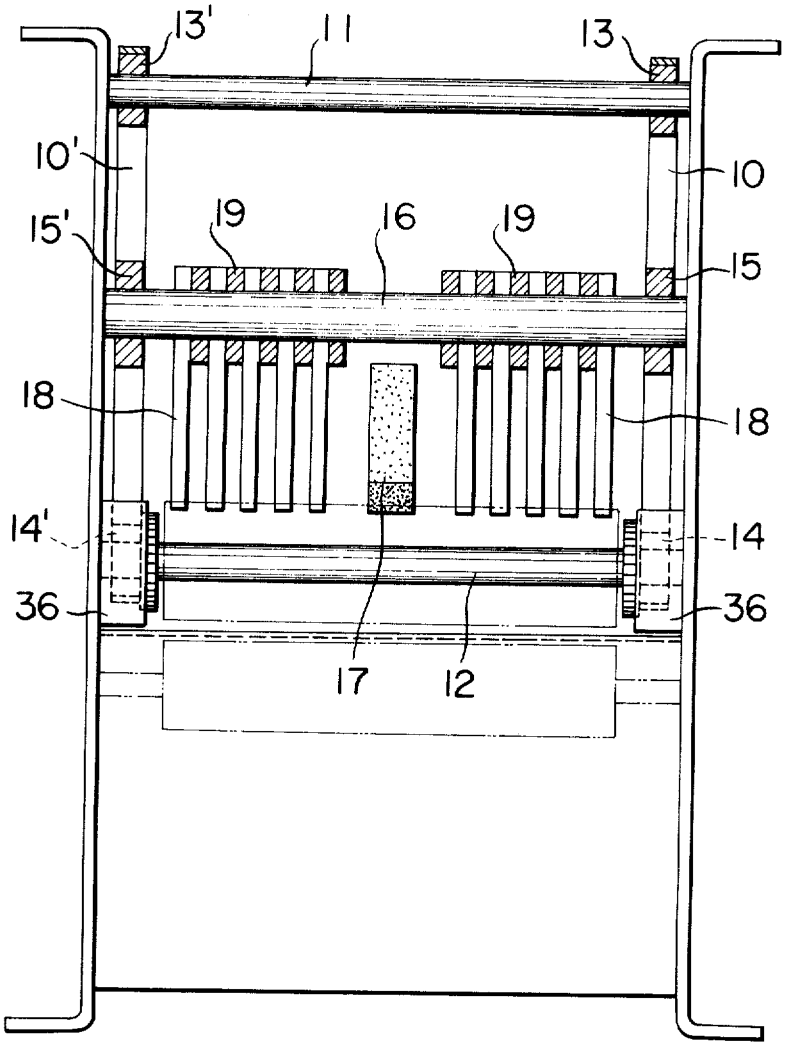
FIG. 4 is a sectional view taken along the line IV—IV of FIG. 3.

As shown in FIG. 3 and FIG. 4, the selector unit A is housed in a selector casing 4 affixed to casing 1.

Referring to FIG. 3, a guide rod 5 is threadably connected to the front end of the selector casing 4 at the right side of FIG. 3 for supporting a cassette slider 6 for vertical sliding motion therealong. Secured to the cassette slider 6 is a cassette tray 7 on which is removably mounted a cassette 9 for storing cards 8 filed therein in an arbitrary sequence, as shown in FIG. 5.

Figure 5:
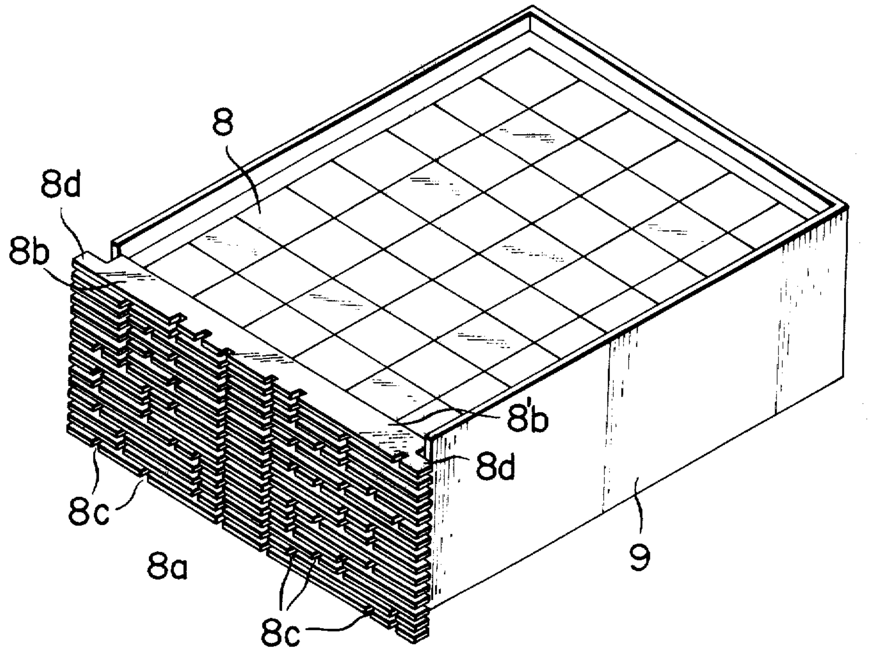
FIG. 5 is a perspective view of a cassette magazine for the microreader.

Referring to FIG. 5, each card 8 is provided along one of its sides with a selection magnet 8*a* and a plurality of (2 as shown) coding sections 8*b* and 8*b*′ disposed at the opposite sides of the magnet 8*a* (as shown), or at the same side thereof (not shown). The coding sections 8*b* and 8*b*′ each have a predetermined number of coding bit positions, e.g., five coding bit positions, with each bit of the coding bit section being represented by a notch or by the absence of a notch at the bit position. The cards 8 are coded in an *r*-out-of-*n* code, e.g., in a 2-out-of-5 code in which notches 8*c* are formed in two of the five bit positions. The cards 8, coded in this manner, are stacked in an arbitrary sequence in the cassette 9, with the lugs 8*d*, 8*d* formed to project from opposite ends of the coding bit position side of the cards 8. The cards 8 are aligned with one another, and the margins thereof having the coding bit positions stick out of the cassette 9 and are exposed to view.

A pair of endless belts 10, 10', shown in FIG. 3 and FIG. 4, are mounted at opposite sides of the selector casing 4 and are maintained in contact with the lugs **8*d*, 8*d* of the cards 8 stored in the cassette 9, which in turn is mounted on the cassette tray 7. The belts 10, 10' are trained about pulleys 13, 14 and 13', 14' respectively which are rotatably supported by shafts 11 and 12 connected at opposite ends to the selector casing 4.**

The belts 10, 10' are maintained in contact with idle pulleys 15, 15' respectively substantially at the central portion of the belt runs nearer to the cassette 9, the idle pulleys 15, 15' being rotatably supported by a shaft 16 secured at opposite ends to the selector casing 4. The relative positions of the pulleys 13, 15 and 14 are set such that the portion of the cassette side run of the endless belt 10 which is disposed between pulleys 13 and 15 extends parallel to the direction of vertical movement of the cassette 9 and is maintained in contact with the coding bit position side of each card 8, and the portion thereof which is disposed between pulleys 15 and 14 extends obliquely with respect to the direction of vertical movement of the cassette 9 so that it moves away from the coding bit position sides of the cards 8 when going downwardly. The relative positions of the pulleys 13', 15' and 14' with respect to the endless belt 10' are similar to the aforementioned relative positions of the pulleys 13, 15 and 14 with respect to the endless belt 10.

A withdrawal magnet 17 is suitably supported in the selector casing and has an attracting surface 17' which is disposed parallel to the obliquely extending portions of the coding bit position side runs of the endless belts 10, 10' that are disposed between pulleys 15 and 14, and 15' and 14' respectively. The withdrawal magnet 17 is fixed in position in the selector casing 4, in which it is juxtaposed to each of the magnets **8*a* of the cards 8 in the cassette 9. The cassette slider 6 and endless belt 10** are moved in synchronism with each other in the same direction and at the same rate by a drive (not shown) which may be of any suitable type.

The pulleys 14, 14' are each provided with peripheral teeth so as to separate the cards 8 from the magnet 17 against the attracting force of the latter.

A plurality of selector bars 18 corresponding in number to the coding bit positions in the coding sections **8*b*, 8*b*' of the cards 8 are disposed adjacent the magnet 17 in positions corresponding to the coding bit positions. As shown, two sets of selector bars 18, each set comprising five selector bars 18, or 10 in total, are each disposed on one side of the magnet 17. In FIG. 4, the two sets of selector bars 18 are pivotally supported by a shaft 16, and a spacing member 19 is attached to one side of each selector bar 18 so as to accurately set the relative positions of the selector bars 18 with respect to the coding bit positions of the cards 8.**

Each selector bar 18 is formed with two arms **18*a* and 18*b* extending substantially in opposite directions from its central portion, at which it is supported by the shaft 16. The arm 18*a* is a selector arm performing function selection functions while the arm 18*b*** is a sensing arm for sensing instructions given by the selector bar setting means.

Figure 6:
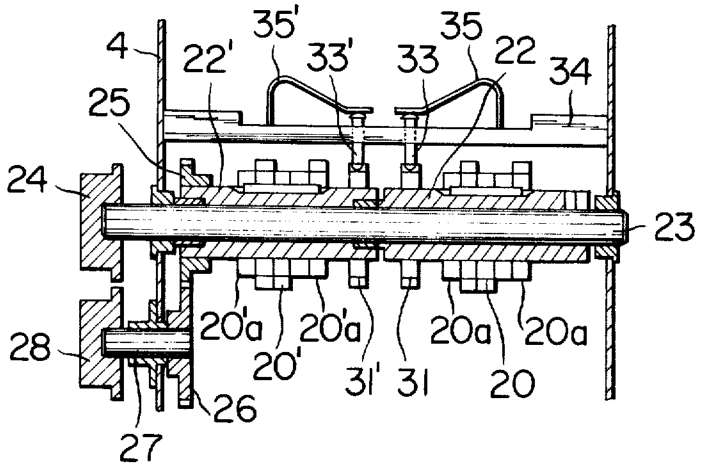
FIG. 6 is a sectional view of the selector unit, showing its selector bar control cam section in detail.

The sensing arms **18*b* are each maintained at their ends in contact with one of the cam elements of a selector bar setting cam 20 or 20' of the control cam section shown in FIG. 6 by the biasing force of a spring 21 shown in FIG. 3. The springs 21, which are equal in number to the selector bars 18, are each connected at one end to one of the selector bars 18 and at the other end to the selector casing 4. The cams 20, 20' each comprise cam elements 20*a*, 20's which are equal in number to the selector bars 18, or ten cam elements in total. The cam elements 20*a*, 20's may be formed independently of each other and interconnected as cams 20 and 20' respectively, or formed integrally as the cams 20 and 20'** respectively and later formed into cam elements as ring-shaped members.

The cam 20 is keyed to a cam shaft 22 while the cam 20' is keyed to a cam shaft 22'. The cam shaft 22 is fitted over and secured, as by a screw, to a shaft 23 rotatably supported by the selector bar casing 4, while the cam shaft 22' is fitted over the shaft 23 for rotation relative thereto.

A dial 24 is removably attached to an end portion of the shaft 23 which projects outwardly of the casing 1. A gear 25 is mounted on the cam shaft 22' and is maintained in meshing engagement with a gear 26 secured to a shaft 27 rotatably supported by the selector casing 4. Another dial 28 is removably attached to an end portion of the shaft 27 which projects outwardly of the casing 1.

Figure 7:
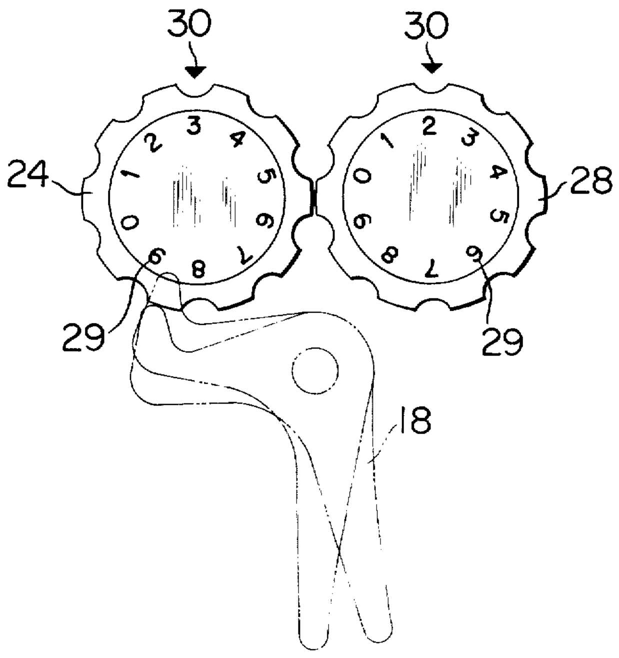
FIG. 7 is a left side view of a portion of FIG. 6.

The dials 24 and 28 each have a predetermined number of digits marked thereon. In the example shown in FIG. 7, each dial has 10 digits 29, e.g., digits '0' to '9', marked on its marginal portion and disposed equidistantly from one another. Two arrows 30, 30 are marked in predetermined positions on the casing 1, each for indicating a digit on the respective dial. In the example shown in FIG. 6 and FIG. 7, the cams 20 and 20' each make one complete revolution and give 10 different instructions to the selector bars 18 when the dials 24 and 28 each make one complete revolution. Thus, if the cam 20 indicates the position of the units of a decimal number and the cam 20' indicates the positions of the tens of that number, it will be possible to give one hundred different instructions (from 0 to 99) to the selector bars 18 by using the two cams 20 and 20'. By using two dials 24 and 28 indicating the position of the units and of the tens respectively of a number in the decimal notation system it will be possible to positively and readily set the selector bars 18 at any desired decimal number in the range from 0 to 99. In the example shown in FIG. 7, dials 24 and 28 are in a position to set the selector bars 18 at the card numbered '32'. Cams 20 and 20' may have identical cam surfaces. Thus, if three cams 20 are employed and one more dial 24 is used, it is possible to set the selector bars at a card having any decimal number from '000' to '999'.

In the embodiment shown and described herein, cams 20 and 20' are shaped and configured such that if the number of cam elements of each of the cams 20 and 20', the number of coding bit positions in each of the coding sections **8*b* and 8*b*' of a card is $n$, the total number of cards to which the selector bars 18 can be set by each of the cams 20 and 20' is N, and the number of coding bit positions provided with a notch is $r$, then the relation $N=n.r.$ exists. In the example shown, $N=10$ for each of the coding sections 86 and 86'** when $n=5$ and $r=2$. The cam elements of each selector bar setting cam are circumferentially divided into N or 10 cam zones so that each cam zone comprises *n* coding positions. A subset *r* of the coding positions of each set of *n* coding positions are formed either as elevated or depressed areas of the circumferential cam surface, and the rest of the *n* coding positions of each cam zone are formed either as depressed or elevated areas respectively.

Table 1 shows the arrangement of the elevated areas which represent the two coding bit positions, each having a notch in the 10 cards coded in an *r*-out-of-*n* code or in a 2-out-of5 code as aforementioned. In the table, the marks O indicate the positions of the elevated areas, all other positions being depressed areas.

Table 1

| Code No. | No. 1 Cam Element | No. 2 Cam Element | No. 3 Cam Element | No. 4 Cam Element | No. 5 Cam Element |
|---|---|---|---|---|---|
| 0 | O | O | | | |
| 1 | | | O | O | |
| 2 | O | | | | O |
| 3 | | O | | O | |
| 4 | | | O | | O |
| 5 | O | | | O | |
| 6 | | O | O | | |
| 7 | | | | O | O |
| 8 | O | | O | | |
| 9 | | O | | | O |

In this case, a card having a code number 0 is represented by the cam zones which comprise: a depressed area, an elevated area, a depressed area, an elevated area and a depressed area in the indicated order.

Figure 8:
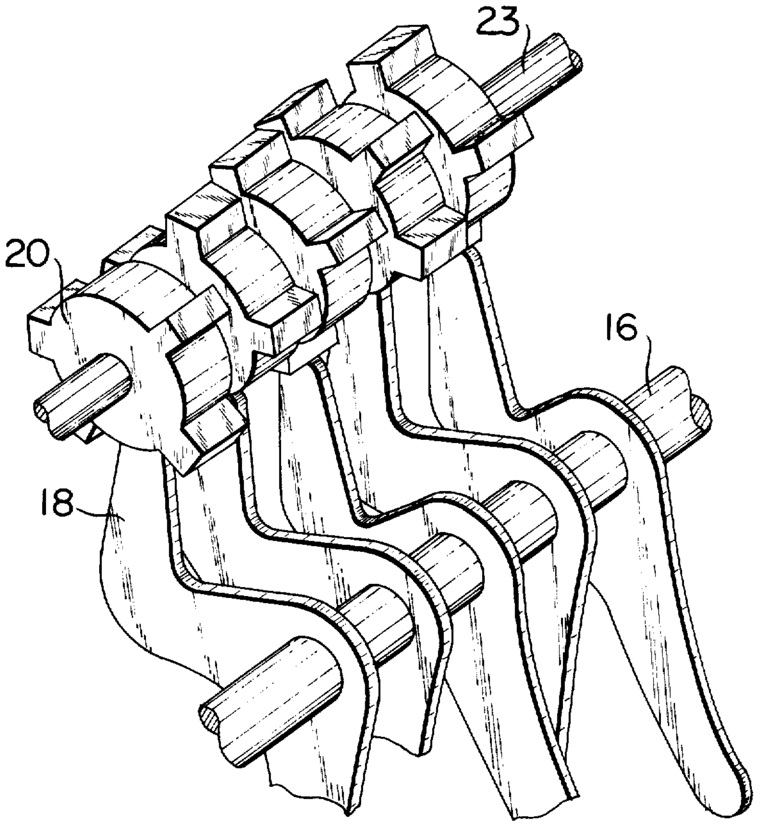
FIG. 8 is a perspective view of the control cam of FIG. 6 and of associated selector bars.

It will be seen that four out of the 10 circumferentially divided cam surfaces of each cam element are formed as elevated area in Table 1. Cam 20 is shaped as shown in FIG. 8 and the cam 20' is preferably identical in shape, in order to avoid manufacturing two different parts. However, the combination of the elevated areas on cam 20' for *r* coding position may be different from the combination of the elevated areas on cam 20.

Each selector bar 18 cooperates with one of the coding bit positions, and the selector arm 18*a* of each selector bar 18 is moved to an operative position when its sensing arm 18*b* is in engagement with an elevated area in cam 20 or 20', and is moved to an inoperative position when the sensing arm 18*b* is in engagement with a depressed area in cams 20 or 20'. When in the inoperative position, the selector arm is positioned such that it does not stick outwardly of the attracting surface 17' of the withdrawing magnet 17. When in the operative position, it is positioned such that it is disposed substantially parallel to the direction of movement of the coded side edge of cards 8 in the cassette 9.

As shown in FIG. 3 and FIG. 6, click cams 31 and 31' are secured to cam shafts 22 and 22' respectively and serve to ensure that the setting of the selector bars 18 can be carried out positively, that the cams 20, 20' and the dials 24, 28 can be set positively at correct positions, and that the cams 20, 20' can be maintained in their set positions without being displaced from such positions by mechanical vibration or the like. The click cams 31, 31' are each formed on the outer periphery with valleys 32 corresponding in number and position to the N cam zones into which the cam elements of the cams 20, 20' are circumferentially divided as shown in FIG. 3 with reference to the click cam 31'. A click pin 33 is maintained in pressing engagement with one of the valleys 32 formed in the click cam 31 while another click pin 33' is maintained in pressing engagement with one of the valleys 32' formed in the click cam 31' as shown in FIG. 6. Click pins 33 and 33', which are guided for sliding motion in a guide slot formed in a guide bar 34, are urged into pressing engagement with the click cams 31, 31' by the biasing forces of plate springs 35 and 35' respectively.

When the dials 24, 28 are turned, click pins 33, 33', engaged in the valleys in the click cams 31, 31', are pushed up and brought into engagement with the adjacent valleys after they have moved over the crests between the adjacent valleys. Upon sensing a change in the resistance offered by the dials 24, 28 to the hand, the operator can make sure that the dials are positvely moved from one position to the next position. After the dials 24, 28 are set, the click pins 33, 33' are maintained in engagement with the valleys 32 in the click cams 31, 31', thereby preventing deviation of the selector bar setting cams 20, 20' from their positions.

Referring to FIGS. 3 and 4, separator means 36, 36', are disposed near opposite sides of the selector casing 4 for guiding the lugs 8*d* of a card 8. Each separator element 36 includes a withdrawing guiding surface 37 disposed parallel to the attracting surface 17' of the withdrawing magnet 17, the withdrawing guiding surface 37 of the separator element 36 and the attracting surface 17' of the magnet 17 defining therebetween a passage for the lug 8*d* to pass therethrough. Each separator element 36 also includes transit guiding surface 38 which, together with a back surface 39 of the magnet 17, defines a passage for the lugs 8*d* of the cards stored in the cassette 9 to move therethrough, and a withdrawing guiding surface 40 forming a return passage for the card to move therethrough in return movement after the information contained in the card has been read. The withdrawing guiding surface 37, transit guiding surface 38 and withdrawing guiding surface 40 form a triangle as viewed in FIG. 3.

The separator means 36, 36' cooperate with the selector arms 18*a* of the selector bars 18 to guide the lugs 8*d* of the card attracted by the withdrawing magnet 17 to move along the withdrawing guiding surface 37, and to guide the lugs 8*d* of the card prevented by selector arms 18*a* from being attracted by the withdrawing magnet 17 to move along the transit guiding surface 38.

Figure 9:
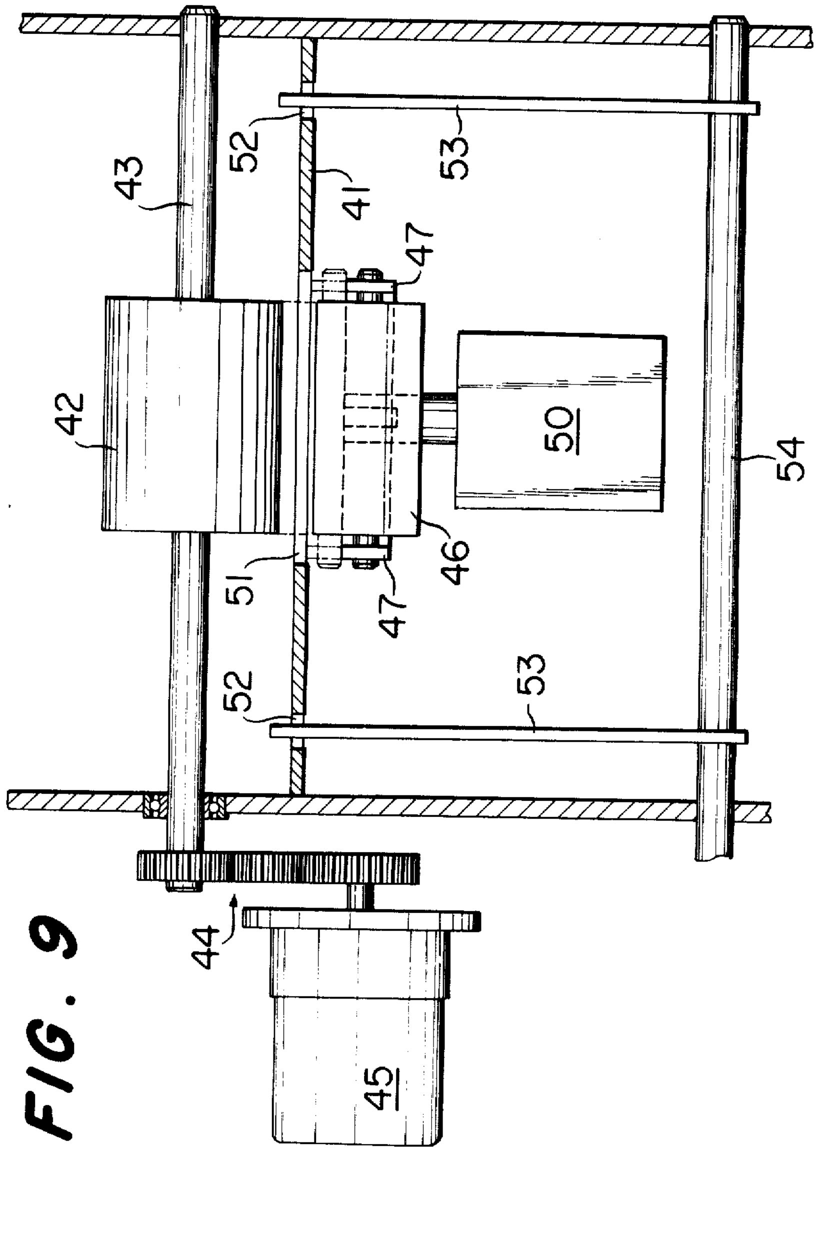
FIG. 9 is a sectional view taken along the line IX—IX of FIG. 3.
Figure 10:
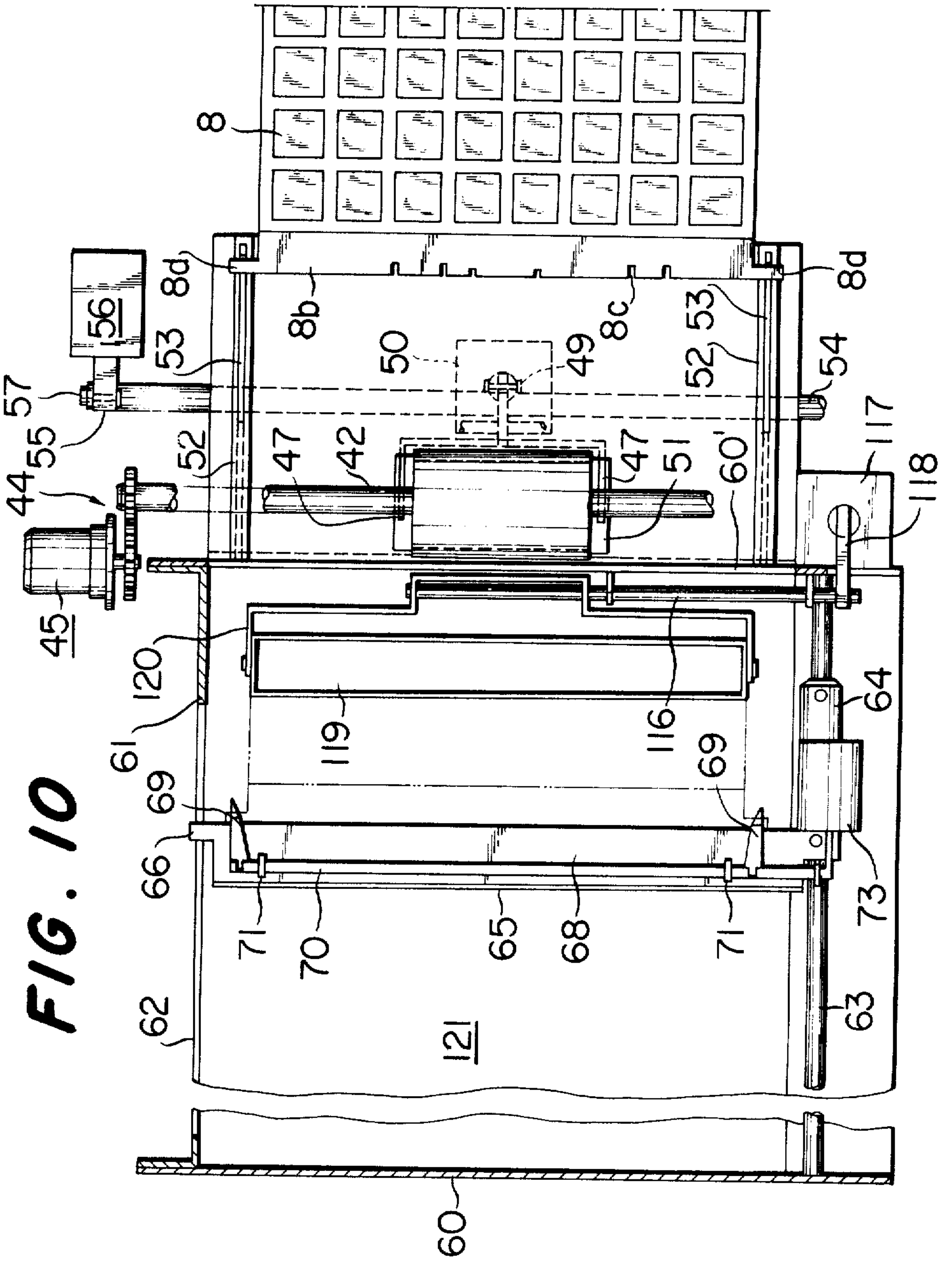
FIG. 10 is a sectional view taken along the line X—X of FIG. 3.

A guide bar 41 is mounted in the selector bar casing 4 and is disposed below the pulleys 14, 14' to extend across the width of the casing 4. A feed roller 42 is secured to a shaft 43 rotatably supported by the selector bar casing 4 and is disposed in a position which is above the guide plate 41 and leftwardly of the pulley 14 in FIG. 3. As shown in FIG. 9 and FIG. 10, the shaft 43 is driven from a drive 45 through a transmission gearing 44. Disposed below the guide plate 41 and juxtaposed to the feed roller 42 is an idle roller 46 which is rotatably supported at one end of arms 47, 47 pivotally supported at 48 (see FIG. 3) by the guide bar 41 and pivotally connected at the other end to a solenoid 50 through a pin 49.

Upon energization of the solenoid 50, the arms 47 pivot about pins 48, supported by the guide plate 41, and move the idle roller 46 from an inoperative position shown in solid lines to an operative position shown in dash-and-dot lines in FIG. 3. When in the operative position, the idle roller 46 presses against the feed roller 42 to feed the card 8 nipped thereby; when in the inoperative position, the idle roller 46 is spaced apart from the feed roller 42, so that the card 8 disposed between the two rollers is not fed because it is not pressed by the feed roller 42. The guide bar 41 is formed therein with an opening 51 through which the idle roller 46 can be moved into and out of engagement with the feed roller 42.

Referring to FIG. 9, slits 52, 52 are formed near opposite ends of the guide bar 41 for the lugs 8*d*, 8*d* of the card 8 to move therethrough. Feed levers 53, 53 secured to a shaft 54 rotatably supported by the selector bar casing 4 each have a front end portion which moves through one of the slits 53, 53 while pushing one of the two lugs 8*d* of the card 8 when the card is withdrawn from the cassette 9 or returned thereto. As seen in FIG. 10, a lever 55 is secured at one of its ends to one end of the shaft 54 and is pivotally connected at its other end through a pin 57 to an actuator of a solenoid 56 secured to the selector bar casing 4. Upon energization of the solenoid 56, the feed levers 53 pivot about shaft 54 and move between an inoperative position shown in solid lines in FIG. 3 to an operative position shown in dash-and-dot lines in the same FIG. 3.

The feed levers 53, 53 each have a top end portion which is disposed below the triangular member 36' of each separator element 36 and extends above the level of guide bar 41 when in the inoperative position. Upon actuation of the solenoid 50, feed levers 53 pivot counterclockwise (in FIG. 3) and push the lugs 8*d* of the card moved along the withdrawing guiding surface 40 leftwardly. When in the position in which feeding of the card is finished, the end portion of feed levers 53, 53 remain stationary and disposed below the level of guide bar 41, at the left-hand end thereof in FIG. 3. Thus, the card stops moving when the end portions of feed levers 53, 53 are released from engagement with the lugs 8*d* of the card slightly before feed levers 53 stop moving.

In the selector unit A: the dials 24, 28 and the selector bar setting cams 20, 20' constitute a selector bar setting section; the withdrawing magnet 17, the selector bars 18 and the separator means 36 constitute a card selection section; and the feed roller 42, the idle roller 46 and the feed levers 53 constitute a card withdrawing section.

Disposed in the casing 1 adjacent the selector unit A is a card moving unit B which performs the function of receiving the card supplied from the card withdrawing section of a selector unit A and moving the same such that a desired frame of the card is aligned with the optical path of a condenser system.

Figure 11:
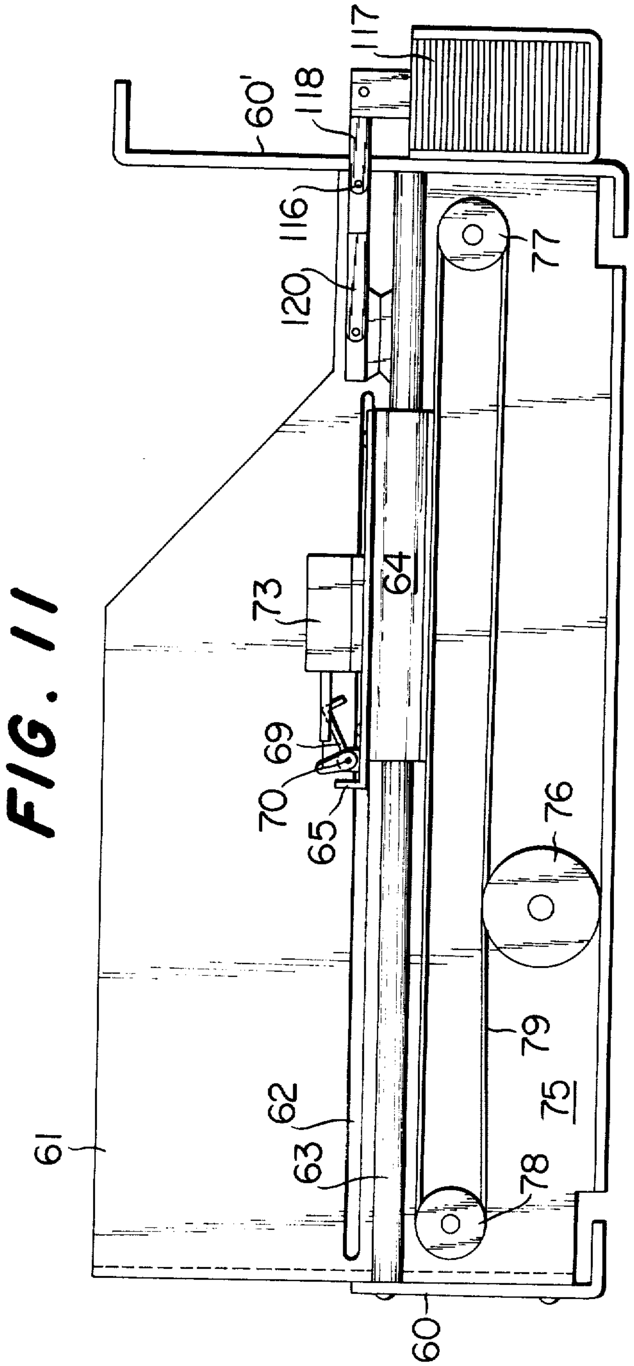
FIG. 11 is a front view of a card moving unit forming a part of the microreader.
Figure 12:
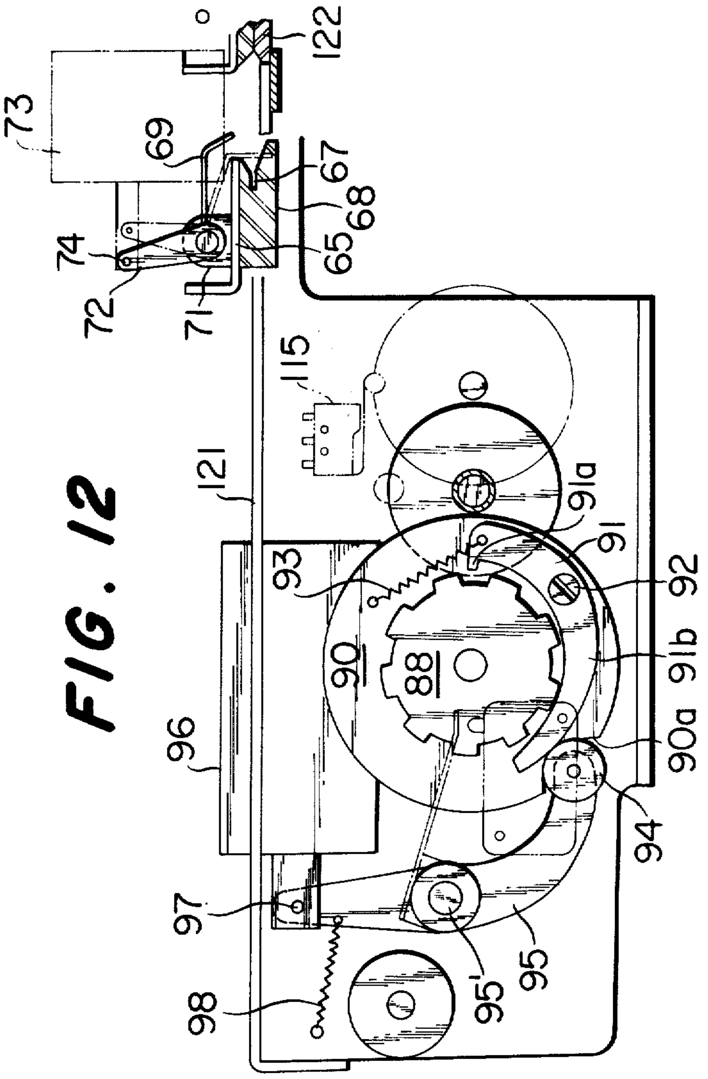
FIG. 12 is a view similar to FIG. 11 but shows the card moving unit with the front plate removed.

As shown in FIG. 11 and FIG. 12, a horizontally oriented guide slot 62 is formed in one side plate 61 of a unit casing 60 and a guide rod 63 is mounted at the other side of the unit casing 60 for guding a slider 64 for sliding movement therealong. The slider 64 mounts thereon a support plate 65. A guide portion 66 of the support plate 65 is received in the guide slot 62 formed in the side plate 61 for guiding the support plate 65 therealong. The guide portion 66 is provided at an end of the support plate 65 opposite to the end thereof at which the plate 65 is mounted on the slider 64. As seen in FIG. 12, a card guide 68, formed therein with a groove 67 extending across its width for receiving one end of the card, is secured to the support bar 65. As seen in FIGS. 10 and 11, a shaft 70, having card catchers 69, 69 secured thereto, is rotatably supported by supporters 71, 71 attached to the support bar 65.

Referring to FIG. 12, a lever 72 is connected at one end to shaft 70 and is pivotally connected at the other end, through a pin 74, to an actuator of a solenoid 73 mounted on the slider 64. The card catchers 69, 69 shown in FIG. 10 and FIG. 11 pivot about shaft 70 when solenoid 73 is energized. When moved to an operative position by energization of solenoid 73, the card catchers 69, 69 hold the lugs 8*d*, 8*d* of the card 8 inserted in the groove 67 formed in the card guide 68 between the card catchers 69, 69 and card guide 69 to thereby grip the card. When disposed in an inoperative position, the card catchers 69, 69 are spaced apart from the card guide 68 so that the card can freely move into and out of the groove 67 in the card guide 68. The operative and inoperative positions of the card catchers 69, 69 are shown in broken and solid lines respectively in FIG. 12.

Referring to FIG. 11, a drive drum 76, an idle pulley 77 and a tensioning pulley 78 are rotatably supported on a side plate 75 juxtaposed to the side plate 61 of the unit casing. A transmission means 79, which may be a belt or a wire connected at opposite ends to the slider 64, or an endless belt secured at one point to the slider 64, is trained over the idle pulley 77, the drive drum 76 and the tensioning pulley 78, and is connected to the slider 64 so as to form a closed circuit comprising: the slider 64, the idle pulley 77, the drive drum 76, the tensioning pulley 78 and the slider 64. The belt 79 is wound around the drive drum 76 at least once, and the tensioning pulley 78 is supported by a suitable shaft which can be shifted to adjust the tensioning of the belt 79.

When the drive drum 76 is rotated, the belt 79 moves and the slider 64 and the card guide 68 mounted thereon also move. Thus, the card guide reciprocates in a predetermined range.

Figure 13:
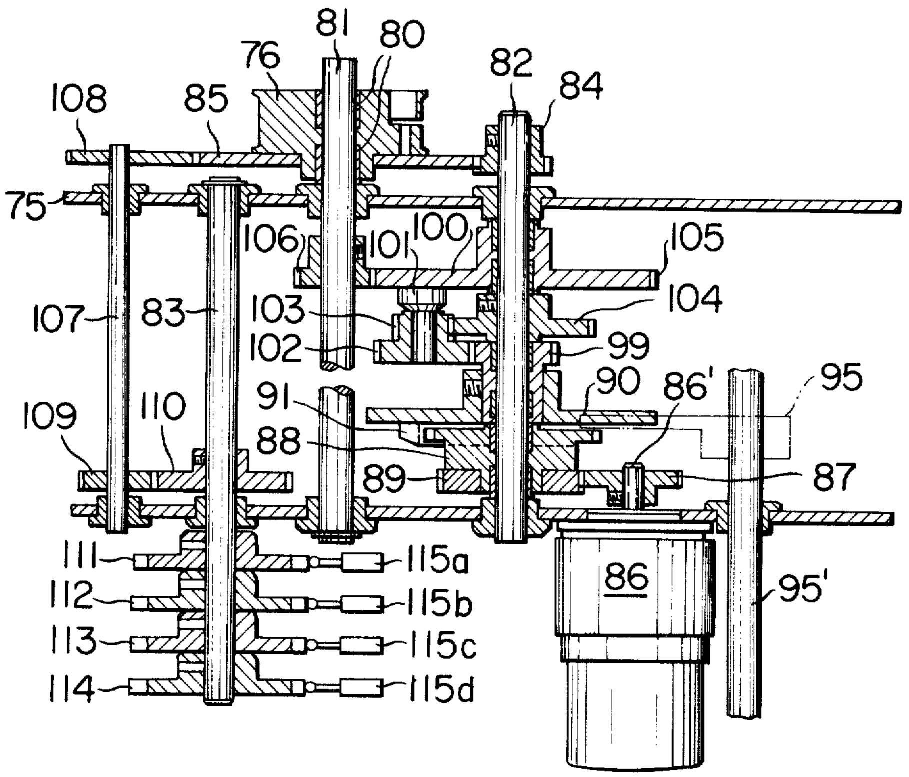
FIG. 13 is a bottom plan view of FIG. 12.

An operation device for moving the card guide 68 in accord with instructions from a control panel is disposed in the unit casing 60 as shown in FIG. 12 and FIG. 13. The operation device comprises a find adjustment shaft 81 rotatably supporting the drive drum 76 through metallic elements 80 and rotatably supported by side walls 61 and 75. An intermediate shaft 82 and a cam shaft 83 are disposed parallel to and on opposite sides of the fine adjustment shaft 81 and are also rotatably supported by the side walls 61 and 75. Secured to an end portion of the intermediate shaft 82, which extends outwardly of side wall 75, is a gear 84 which is maintained in meshing engagement with a gear 85 secured to the drive drum 76.

A drive motor 86 is secured to side plate 61, and a gear 87 is mounted on an output shaft 86' of the motor 86 and is maintained in meshing engagement with a gear 89 secured to a ratchet wheel 88 rotatably supported by the intermediate shaft 82.

Disposed adjacent to the ratchet wheel 88 and rotatably supported by the intermediate shaft 82 is a rotary disc 90 which has a pawl 91 pivotally connected thereto through a pin 92, as shown in FIG. 12. The pawl 91 includes a front end 91*a* adapted to be brought into engagement with one of the teeth of the ratchet wheel 88 by the biasing force of a spring 93 connected at one end to the rotary disc 90 and at the other end to the pawl 91, and an arm 91*b* for controlling the movement of the front end 91*a*.

The rotary disc 90 has an outer periphery serving as a cam surface formed therein with a valley 90*a*. A cam follower 95 is rotatably supported by a shaft 95' and rotatably supports at one end a roller 94 which is maintained in engagement with the other periphery of the rotary disc 90 and is pivotally connected at the other end through a pin 97 to an actuator of a solenoid 96. The cam follower 95 is urged into pressing engagement with the outer periphery of the rotary disc 90 at all times by the biasing force of a spring 98 connected at one end to the casing 60 and at the other end to the cam follower 95. Normally, the roller 94 is maintained in engagement with the valley 90*a* in the outer periphery of the rotary disc 90 and presses the end of the arm 91*b* of the pawl 91 downwardly so as to release the front end 91*a* from engagement with the teeth of the ratchet wheel 88.

Upon energization of solenois 96, its actuator pulls the cam follower toward solenoid 96 and causes the arm 95 to pivot and move the roller 94 out of engagement with the valley 90*a*. This brings the front end 91*a* into engagement with the teeth of the ratchet wheel 88 and stops it from rotating. The rotary disc 90 moves with respect to the ratchet wheel 88 and makes one revolution. While the rotary disc 90 makes one revolution, the solenoid 96 is de-energized, so that the roller 94 of the cam follower 95 is brought into engagement with the valley 90*a* again and presses the arm 91*b* downwardly to thereby release the front end 91*a* of pawl 91 from engagement with the teeth of ratchet wheel 88. Thus, the rotary disc 90 stops rotating.

The ratchet wheel 88, pawl 91, rotary disc 90 and cam follower 95 constitute one revolution normal and reverse rotation clutch means.

As shown in FIG. 13, the rotary disc 90 is secured to an input sun gear 99 which is rotatable relative to the shaft 82 and is maintained in meshing engagement with a first planetary gear 102 rotatably supported by a stub shaft 101 secured to a planetary gear supporting disc 100. Formed integrally with the first planetary gear 102 is a second planetary gear 103 which is in meshing engagement with an output gear 104 secured to the intermediate shaft 82. The sun gear 99, planetary gears 102 and 103, output gear 104 and planetary gear support disc 100 make up a planetary gearing.

The output of the one revolution normal and reverse rotation clutch means (i.e., the rotation of rotary disc 90) is transmitted to the planetary gearing and is transmitted by the output gear 104 of the latter to the intermediate shaft 82 to thereby rotate the drive drum 76.

The planetary gear support disc 100 is rotatably supported by the intermediate shaft 82 and is formed on its outer periphery with a serration 105 maintained in meshing engagement with the fine adjustment gear 106 secured to the fine adjustment shaft 81.

Figure 14:
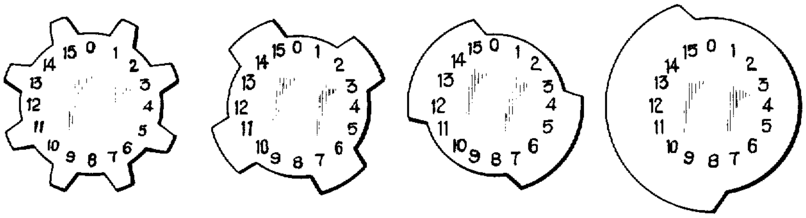
FIG. 14 shows counter cams forming a part of the unit of FIG. 11.

As shown in FIG. 13, a counter shaft 107 is disposed parallel to the fine adjustment shaft 81 and is rotatably supported by side plates 61 and 75 and has secured thereto a gear 108 maintained in meshing engagement with the gear 85. Another gear 109 is secured to the counter shaft 107 and is maintained in meshing engagement with a gear 110 secured to the cam shaft 83, which has secured thereto an A cam 111, a B cam 112, a C cam 113 and a D cam 114. The outer periphery of each of these cams is divided into cam zones corresponding in number to the frames in one longitudinal row of frames of a card 8 from which a desired frame is selected by moving the card by the card guide 68. Such cam zones may be, for example, 16 is number. The 16 cam zones are designated by numerals 0 to 15, as shown in FIG. 14.

The cam zones on the A cam 111 are formed alternately as elevated areas at cam zones 1, 3, 5, 7, 9, 11, 13 and 15. The B cam 112 is formed with four elevated areas disposed equidistantly from one another, so that cam zones 2 and 3, 6 and 7, 10 and 11 and 14 and 15 are elevated areas. The C cam 113 is formed with two elevated areas disposed in positions on the outer periphery which are diametrically opposite to each other, so that cam zones 4 to 7 and 12 to 15 are elevated areas. The D cam 114 is formed with an elevated area disposed on one half of its outer periphery and the other one half of its outer periphery is a depressed area, so that cam zones 8 to 15 are an elevated area. The cams 111, 112, 113 and 114 are secured to the cam shaft 83 and are arranged such that the positions of the same numeral (e.g. 0) on all the cams are aligned on one line.

Counter switches 115*a*, 115*b*, 115*c* and 115*d* are provided for cams 111, 112, 113 and 114 respectively and are actuated by the latter. Specifically, the elevated areas of the cams 111, 112, 113 and 114 turn on the switches 115*a*, 115*b*, 115*c* and 155*d*, respectively, and the depressed areas thereof turn off the respective switches. Thus, when the cam shaft 83 rotates, the switches 115*a*, 115*b*, 115*c* and 115*d* produce 16 different signals by the different combinations of the elevated areas and depressed areas of the cams 111, 112, 113 and 114 which actuate the switches.

Figure 15:
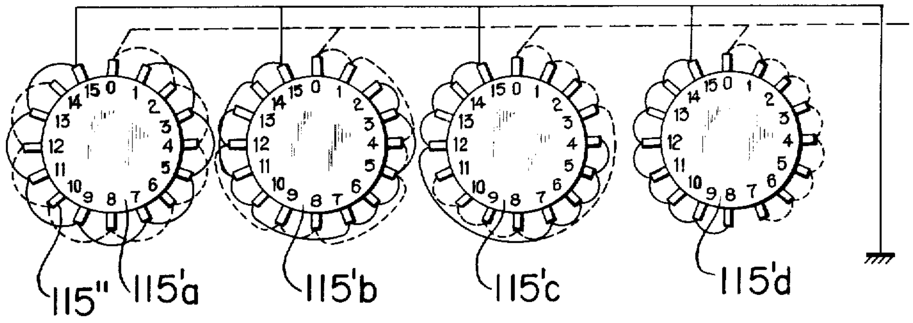
FIg. 15 shows set switches forming a part of the unit of FIG. 11.

FIG. 15 shows rotary switches provided on the control panel of the microreader for indicating the frame (indicating the distance covered by the feeding of the card guide). An A switch 115'*a*, a B switch 115'*b*, a C switch 115'*c* and a D switch 115'*d*, each having 16 contacts 115'', are provided for the cams 111, 112, 113 and 114 respectively. The contacts of each switch are numbered as are the cams. In the A switch 115'*a*, contacts 1, 3, 5, 7, 9, 11, 13 and 15 are connected to each other to form a terminal while the rest of the contacts are also connected to each other to form another terminal. In the B switch 115'*b*, contacts 2, 3, 6, 7, 10, 11, 14 and 16 are interconnected to form a terminal while the rest of the terminals are also interconnected to form another terminal. In the C switch 115'*c*, contacts 4, 5, 6, 7, 12, 13, 14 and 14 are connected to form a terminal while the rest of the contacts are connected to form another terminal. In the D switch 115'*d*, contacts 8 to 15 are connected to form a terminal while the rest of the contacts are connected to form another terminal.

When the position of the desired frame in the longitudinal and transverse rows of frames is indicated by the rotary switches on the control panel, the switches 115'*a*, 115'*b*, 115'*c* and 115'*d* are rotated and the contacts in the corresponding positions are connected to an arithmetic subunit 115'*d* (FIG. 15) of conventional construction and operation (not shown), whose function is to compare the signals from the switches 115'*a*, 115'*b*, 115'*c* and 115'*d* with signals from the switches 115*a*, 115*b*, 115*c* and 115*d* which are settable manually to select a desired frame of a card 8 and to detect a coincidence of these signals.

Setting of the rotary switches actuates the drive motor 86 and energizes the solenois 96 shown in FIG. 13. This rotates the rotary disc 90 of the one revolution clutch means and the drive drum 76, so that the card guide 68 moves. The degrees of angular rotation of the drive drum 76 is transmitted to the cam shaft 83 to rotate the cams 111, 112, 113 and 114. A signal produced by switches 115*a*, 115*b*, 115*c* and 115*d*, as actuated by the cams, is compared with a signal produced by switches 115'*a*, 115'*b*, 115'*c* and 115'*d* by said arithmetic subunit. When they agree with each other, the motor 86 is deactuated; when they do not agree with each other, the motor 86 is further rotated in the normal or reverse direction depending on the difference between them. Thus, solenoid 96 is continuously energized until the two signals agree with each other, as indicated by the output signal from the arithmetic subunit 115'*e*, and the card guide 68 is moved until the indicated frame is brought to a projection position. Control of the position of the card guide is referred to as an X-frame search, and the dial used for indicating the position of the frames in the longitudinal rows of frames is referred to as an X-dial.

As shown in FIG. 10 and FIG. 11, a shaft 116 is rotatably supported by a side plate 60' of the unit casing 60 which is disposed on the selector unit side and has secured to one end a lever 118 which is pivotally connected to an actuator of a solenoid 117 and has secured thereto arms 120, 120 which support a pressure applying bar 119. A pressure applying glass plate 122 is secured to an intermediate plate 121 mounted between the side plates 60 and 60' of casing 60, so that the pressure applying glass plate 122 is juxtaposed to the pressure applying bar 119 and disposed near the underside of card guide 68. The intermediate plate 121 is formed with an opening to fit the pressure applying glass plate 122 therein. The pressure applying bar 119 is either made of glass or formed therein with an opening for light rays to pass therethrough.

The pressure applying bar 119 is normally spaced apart from the pressure applying glass plate 122. However, when the card is set at a predetermined position, solenoid 117 is energized to rotate shaft 116, so that the card is held between the pressure applying bar 119 and the pressure applying glass plate 122.

As shown in FIG. 2, the condenser unit C is disposed so that projected light may pass through the pressure applying bar 119 and the pressure applying glass plate 122. The condenser unit C and the mirror unit D which is contained in the casing 3 are operatively connected to each other so that they may operate in synchronism with each other.

Figure 16:
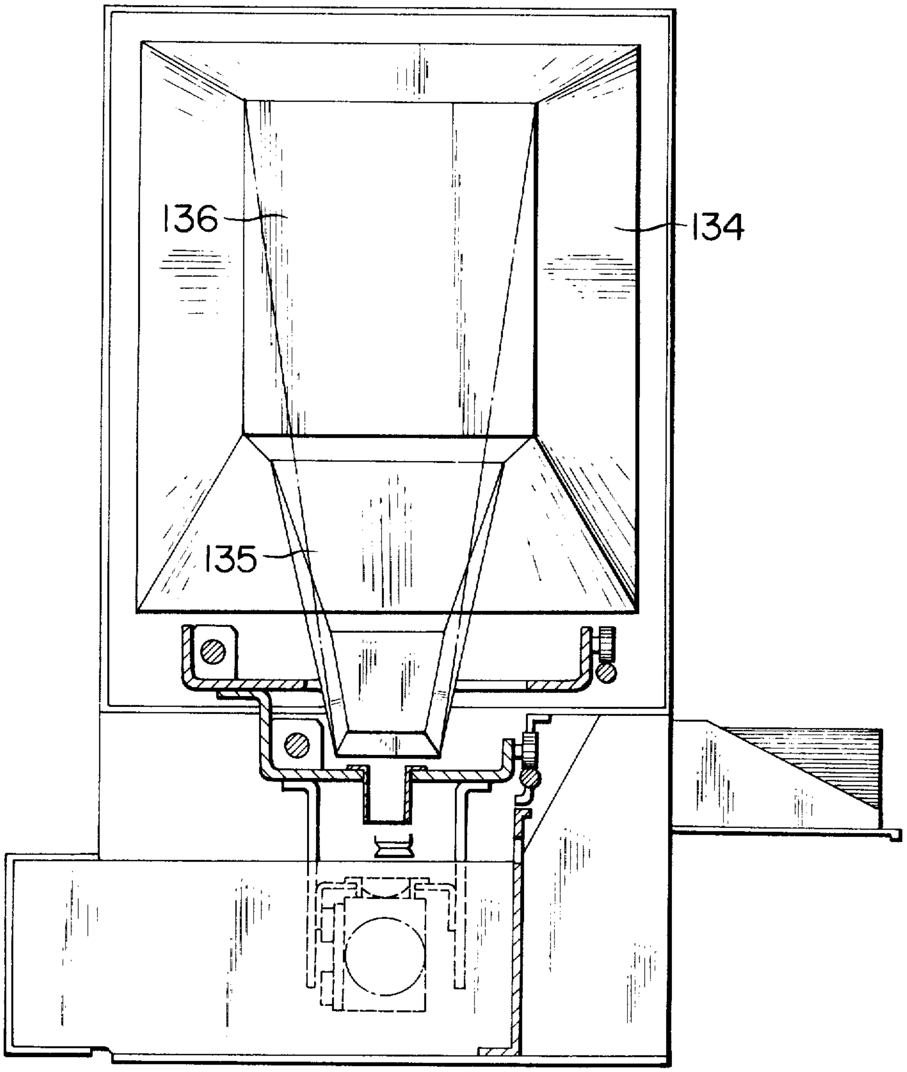
FIG. 16 is a front view of a condenser unit and a mirror unit of the microreader.
Figure 17:
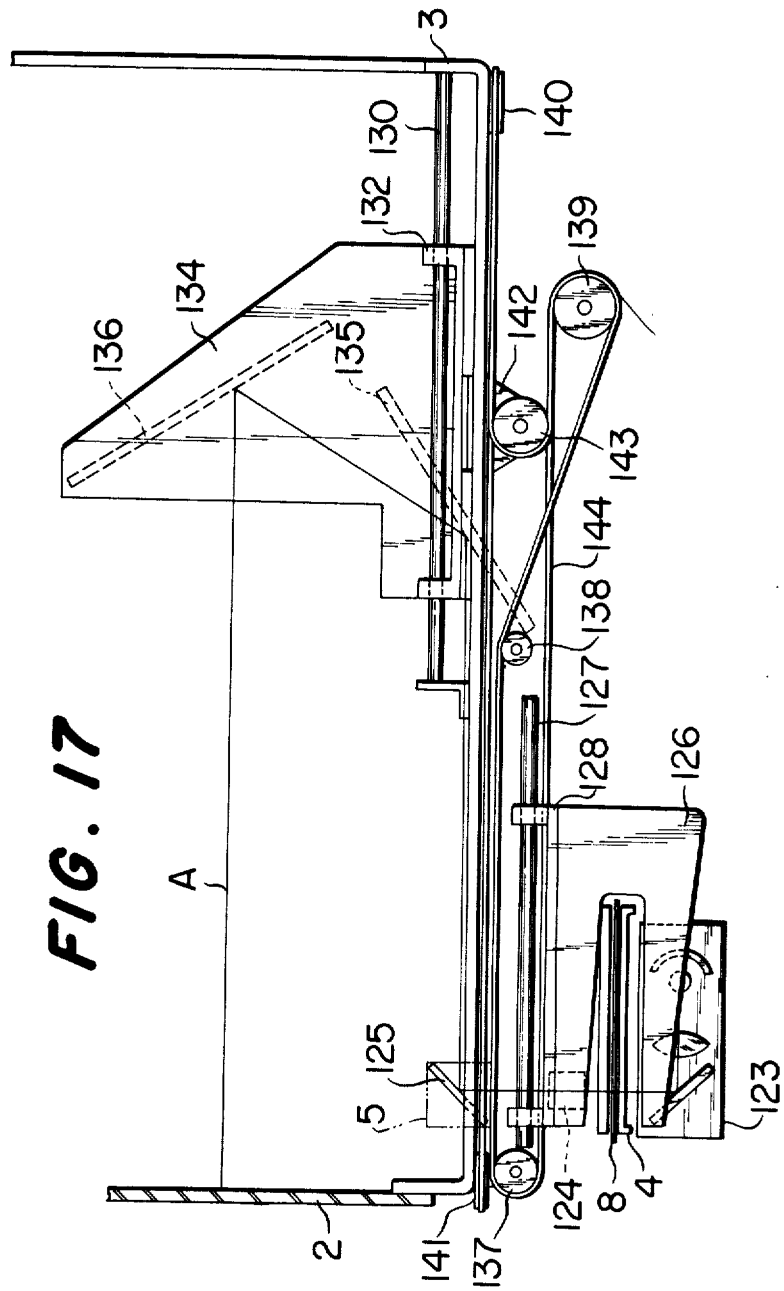
FIG. 17 is a right side view of FIG. 16.

In FIG. 12, FIG. 16 and FIG. 17, a condenser lens system 123, including a condenser lens 123*a*, a mirror 123*b*, a light source 123 and a conventional heat insulating filter, is disposed beneath the intermediate plate 121 for supporting and guiding the card. A projection lens system 124 and a first reflector 125 are disposed above the intermediate plate 121, with the condenser lens system 123, projection lens system 124 and first reflector 125 being supported by a bracket 126. The elements are positioned such that the optical axes of the condenser lens system 123 and the projection lens system 124 pass through the pressure applying bar 119 and the pressure applying glass plate 122.

The bracket 126 has secured to one side thereof a slider 126' which is guided by a guide rod 127 secured to the casing 1 to slide in reciprocating motion in a direction which is at right angles to the direction of reciprocating movement of card guide 68. A roller 128 is rotatably supported at the other side of the bracket 126 for movement in rolling motion on a guide shaft 128 secured to the casing 1 and disposed parallel to the guide rod 127.

Guide rods 130 and 131 are parallel to guide rod 127 and are secured to casing 3. A bracket 134 mounts a slider 132 which is guided by the guide rod 130 for sliding motion and a roller which is guided for rolling motion on guide rod 131. It goes without saying that the rollers are rollingly supported by the bracket and the sliders are secured to the bracket.

A second mirror 135 and a third mirror 136 are mounted on the bracket 134. The second and third mirrors 135 and 136 are secured to the bracket 134, but may be pivotally mounted thereon through angle adjusting screws (not shown), so that fine adjustments of the angles at which the mirrors are mounted with respect to each other can be effected.

Light emanating from the condenser lens system 123 is transmitted through the card 8 and is projected by the projection lens system 124 on the first mirror 125, which reflects the light and projects the same onto the second mirror 135, which in turn reflects and projects the light onto the third mirror 136. The light is reflected thereby and is projected onto the screen 2 mounted in the casing 3.

Figure 18:
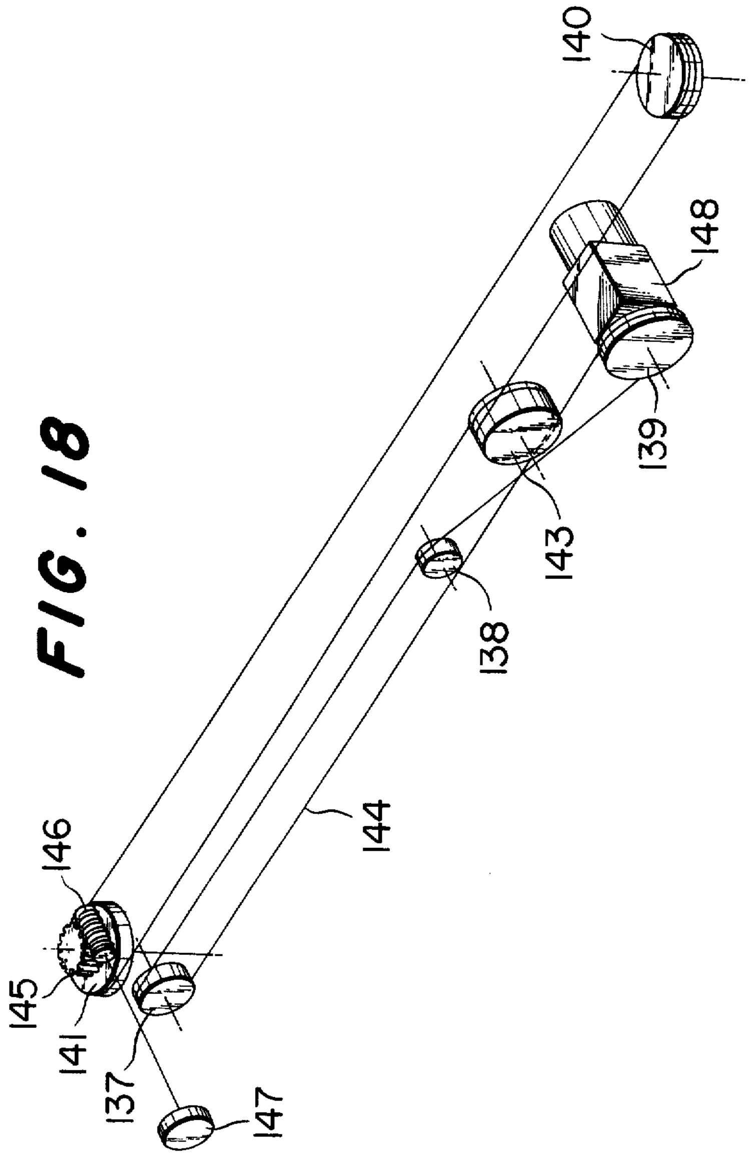
FIG. 18 shows the manner in which the wire shown in FIG. 17 is trained.

As shown in FIG. 17 and FIG. 18, pulleys 137, 138, 139, 140 and 141 are rotatably supported by casings 1 and 3, and a pulley 143 is rotatably supported by a bearing 142 secured to the bracket 134 mounting the second and third mirrors 135 and 136. Transmission means 144, which may comprise either a wire or a belt, is trained over pulley 137, 138, 139, 143, 140, 141, 142 and 137 in the indicated order to form a closed loop. In case the transmission means 144 comprises an endless belt, a portion thereof is secured to the slider 126'; otherwise, opposite ends of the transmission means 144 are secured to the slider 126'.

Secured to the pulley 141 is a screw gear or worm gear 145 which is in meshing engagement with another screw gear or a worm 146 rotatably supported by casing 1. A knob 147 is attached to an end of a shaft supporting the screw gear or worm 146 which extends outwardly of the casing.

The pulley 139 is connected to a one revolution clutch means 138 of the same construction as the clutch means combined with the transmission means shown in FIG. 13. There is provided, for the transmission means 144, frame selection control means for moving the lens system to a position corresponding to the position of a selected frame of the card when the desired frame has been located.

Position control of the lens system is referred to as a Y-frame search just as position control of the card guide is referred to as an X-frame search as aforementioned, and similar control means is employed for the Y-frame search. The control means for the Y-frame search is not shown, because it is a substantial duplicate of the control means for the X-frame search.

When clutch means 138 is rotated either in the normal direction or in the reverse direction by the action of the associated motor and the solenoid in accordance with the position of the desired frame in the transverse row of frames on the card 8, pulley 139 rotates in the normal or reverse direction through an angle which is the product of the angle of rotation for one frame and the number of frames from the first frame to the desired frame in the row. As pulley 139 rotates, the transmission means 144 moves a distance corresponding to the number of frames indicated, and the slider 126' and the bracket 126 to which the transmission means 144 is secured also move a distance corresponding to the number of frames indicated. Thus, the condenser lens system 123, projection lens system 124 and first mirror 125 secured to bracket 126 move longitudinally of the pressure applying bar 119 for a distance corresponding to the number of frames indicated.

Simultaneously, as bracket 126 moves, pulley 143 moves in the same direction as bracket 126 for a distance which is one-half the distance covered by the movement of bracket 126. At this time, the pulley 141 remains stationary.

Thus, the projection lens system 124 and the first mirror 125 moves a distance l while the second mirror 135 and the third mirror 136 move a distance ½, so that the length of the optical path between the first mirror 125 and the screen 2 is kept constant at all times in spite of the fact that the lens system moves.

If the knob 147 is turned while the cluth means 148 is inoperative and the pulley 139 does not rotate, the pulley 141 can be rotated. At this time, the pulley 143 moves while the bracket 126 of the lens systems 123, 124 remain stationary, so that the bracket 124 for the mirror 125 moves. This means that the length of the optical path between the first mirror 125 and the screen 2 can be varied. Thus, the magnification of the image projection onto the screen can be varied. It will be appreciated that the invention permits frames on the selected card projected at the same magnification to be varied as desired by the action of the clutch means 148 and permits the magnification of the image of any frame as desired on the selected card projected on the screen to be varied by manipulating the knob 147.

Figure 19:
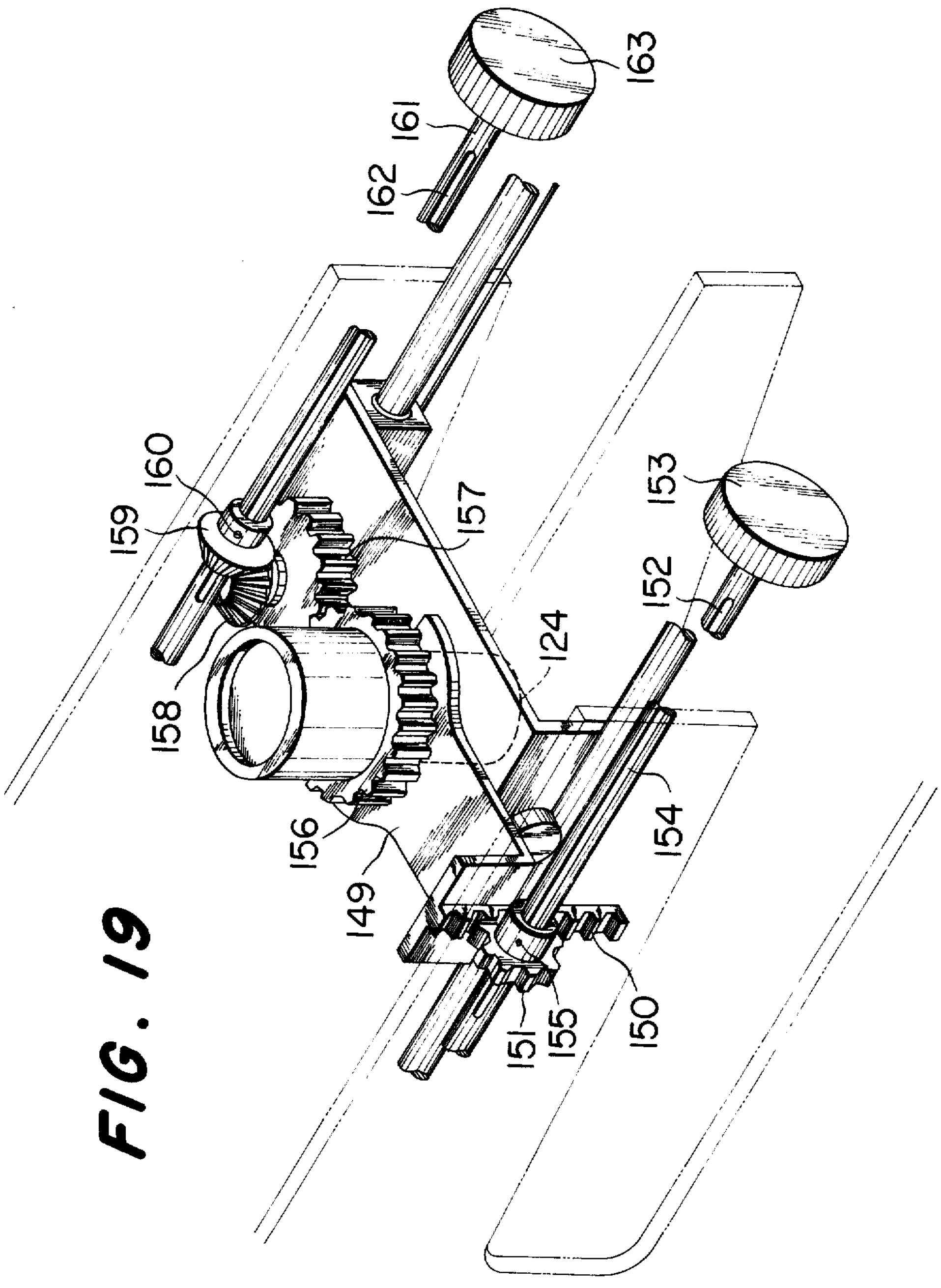
FIG. 19 shows the manner in which the projection lens means of the microreader is mounted.

As shown in FIG. 19, the projection lens system 124 is rotatably supported by an adjusting arm 149 guided for vertical sliding motion by bracket 126. Secured to the adjusting arm 149 is a rack 150 which is in meshing engagement with a pinion 151 supported by a shaft 152 having a knob 153 connected to a portion thereof which extends outwardly of the casing 1. The pinion 151 is supported by the shaft 152 such that it can move axially of the shaft 152 relative thereto but is prevented from rotation relative thereto by a pin 155 received in an axial groove 154 formed in the shaft 152. The pinion 151 is rotatably supported by a bearing mounted on the bracket 126 but is prevented from lengthwise movement relative thereto. When the bracket 126 moves to a selected frame position on the card, the pinion 151 moves relative to the shaft 152. Thus, by turning the knob 153, focusing of the lens system 124 can be readily adjusted no matter where the lens system is disposed.

The projection lens system 124 has mounted on its outer periphery a gear 156 maintained in meshing engagement with another gear 157 which has a sufficiently large width to permit the gear 156 to remain in contact engagement with the gear 157 even when the lens system 124 and gear 156 move axially to adjust focusing. Secured to the gear 157 is a screw gear or bevel gear 158 maintained in meshing engagement with another screw gear or bevel gear 159. Like the pinion 151, the gear 159 is mounted on a shaft 161 through a pin 160 received in a longitudinal groove 162 formed in the shaft 161 so that the gear 159 can move axially of the shaft 161 relative thereto but is prevented from rotating relative thereto.

The shaft 161 is rotatably supported by the casing 1 and has an end portion extending outwardly of the casing 1 and mounting a knob 163 thereon. The gear 159 is supported by the bracket 126 for rotation but is prevented from moving relative thereto. Thus, by turning the knob 163, it is possible to rotate the lens system 124 through the meshing of gears 156 and 157 no matter in what position the lens system 124 is disposed, thereby permitting the slanting of the image projected on the screen 2 to be corrected.

In the microreader, according to the invention, the surface of the intermediate plate 121 is used as the reference surface for the optical systems. This arrangement permits adjusting of the microreader as a whole to be effected with ease.

The second mirror 135 is inclined at 30° with respect to the reference surface, the third mirror 136 is inclined such that it crosses the second mirror 135 at right angles thereto, and the optical axis between the first and second mirrors and the optical axis between the second and third mirrors are disposed as near as possible. This arrangement permits the height of the microreader to be minimized.

Operation of the microreader according to the invention will now be descirbed. A main switch (not shown) is actuated to power the microreader, the cassette 9 is inserted through a port 1' in the casing 1 and is mounted on the ray 7, and the card selector unit is set at a desired number by turning the dials 24 and 28. This turns on the lamp 123*c* inside the condenser unit 123 through a conventional switch arrangement.

Then, a suitable selection switch is actuated. A motor (not shown) is turned on to move the tray 7 downwardly and the belts 10, 10 in synchronism with each other.

The cards 8 in the cassette 9 are moved downwardly as their ends edges move along the belts 10, 10 and are attracted by the withdrawing magnet 17. Those cards 8 whose notches 8*c* are not aligned with the selector bars 18 that are in their operative positions are kept by these selector arms 18*a* from being attracted by the magnet 17. The lugs 8*d* of the cards kept from being attracted by the magnet 17 are led toward the transit guide surfaces 38 of the separator means 36, and these cards 8 are moved downwardly while being retained in the cassette 9. If no desired card is located, the tray 7 simply continues to move downwardly and stops at a selected lower position.

The card whose notches 8c align with the selector bars 18 that are in their operative positions is attracted by the magnet 17 and moves downwardly while pressing against the belts 10, 10, and its lugs 8d are led toward the withdrawing guiding surfaces 40 of the separator means 36. During its downward movement, the motor that moves the tray 7 and the belts 10, 10' is stopped by means of a suitable switch (not shown) when the selected card reaches the guide plate 41, so that the tray 7 stops.

When the tray 7 becomes stationary, the solenois 56 shown in FIG. 10 is energized by a suitable switch (not shown) and the feed levers 53 pivot. At this time, the lugs 8*d* of the selected card are disposed in front of the ends of feed levers 53 so that the card is pushed and moved by the levers 53 and is withdrawn from the cassette 9. When the feed levers 53 reach a feed termination position, the solenoid 50 shown in FIG. 3 is energized by a suitable switch (not shown) to move the idle roller 46 upwardly into pressing engagement with the feed roller 42, with the selected card 8 being held therebetween. The feed roller 42 rotates as the drive 45 is turned on when solenoid 56 is energized, so as to feed the card pressed thereagainst by the idle roller 46.

The card fed by the feed roller 42 stops moving when it is introduced into the groove 67 in the card guide 68 because the drive 45 is shut off by a suitable switch (not shown). Upon the card stopping its movement, the solenoid 73 is energized by the last-mentioned switch, and the card catchers 69 hold the lugs 8*d* of the selected card between the card catchers 69 and the card guide 68.

The relative positions of the parts are set such that the selected card 8 is gripped by the card guide 68 in a position in which the light emanating from the condenser unit 123 is incident on the first row of frames on the card. If the rows of frames parallel to the coding edge of the card are referred to as Y-rows and those of frames perpendicular to the Y-rows are referred to as X-rows, the light from the lens systems 123 and 124 will be incident on the first Y-row (hereinafter referred to as the Y-1 row).

The dials 164 and 165 are manipulated to turn the rotary switches through the frame search dials so as to indicate the position of the frame to be located in terms of the Y-row. The card 8 moves upon actuation of the frame search dials, and the optical systems move in a direction at right angles to the direction of movement of the card, so as to set the projection position on a desired frame on the X-row and Y-row.

In search for a desired frame, a signal is produced by a suitable switch (not shown) to automatically move the magazine or tray 9 to a lowermost position when the selected card 8 is withdrawn in its entirety by the card guide from the cassette. When the projection position is set without the card being completely withdrawn from the magazine, the magazine or tray is held stationary by suitable switch (not shown) in the position in which it is disposed.

When the card guide 68 and the brackets 126 and 134 are set in the selected positions, then the solenoid 117 is energized by a suitable switch (not shown) to fix the selected card in position between the pressure applying bar 119 and the pressure applying glass plate 122.

The knob 153 is turned to effect adjustments of focusing and the knob 163 is turned to effect adjustments of the angle of the image. The knob 147 is turned to effect adjustments of magnification. Thus, read-out of the information can be carried out.

After read-out is finished, the X-frame search dial is returned to the position in which it is set at 1. Upon depressing a load button (not shown), the motor 86 rotates in the reverse direction and the solenoid 96 is energized to move the card guide 68 a distance corresponding to the position of the frame projected, so that the card guide is restored to its stand-by position or the position in which the light of the lens systems is incident on the X-1 row.

Upon restoration of the card guide 68 to its stand-by position, the solenoid 73 is de-energized by a suitable switch (not shown) to move the card catchers 69, so that the lugs 8*d* of the card are released from engagement with the card catchers 69 and the card guide 68. Deactuation of the card catchers 69 rotates the feed roller 42 in the reverse direction to move the card into the cassette 9 again. When the lugs 8*d* of the card reach a position in which they are substantially beneath the feed roller 42, the solenoid 50 is de-energized by a suitable switch (not shown) to move the idle roller 46 downwardly out of engagement with the feed roller 42, so that the card stops moving. This de-energizes the solenoid 56 by means of a suitable switch (not shown), so that the feed levers 53 push back the lugs 8*d* of the card into the cassette 9. When the levers 53 return to their stand-by position, the lugs of the card are moved a greater distance corresponding to the width of the levers 53 than when they are withdrawn from the cassette. This ensures that the card is returned to the cassette and placed in a correct position therein.

Upon returning of the card to the cassette, the tray moves upwardly and stops after actuating suitable limit switches (not shown). This finishes a cycle of operation.

The microreader, according to the invention, is compact in overall size, easy to operate, and low in cost.

The invention permits magnification of the image projected on the screen to be varied, which has not been possible by microreaders of the prior art. The invention also permits setting of the card selector bars to be effected merely by turning dials to set them at a marked number corresponding to the set of coding bit positions of a desired card.

I claim:

1. A microreader having a projection screen and comprising:

card selection means comprising means for receiving a card cassette storing a plurality of cards arranged in a randoom sequence in the cassette, each card having a side made of a magnetic material and having a selected pattern of notches, and each card having a plurality of frames arranged in rows and columns along the X and Y direction, and means including a plurality of selector bars and magnetic means engaging the notched side of the cards to move a card having a selected pattern of notches to a selected position in a projection plane;

an optical system comprising, in sequence along an optical axis, a light source, a condenser lens system, a projection lens system and a first, second and third mirror with a light beam emanating from the light source, proceeding along said optical path and impinging on the projection screen, with said projection plane being disposed between the condenser lens system and the projection lens system;

means operative in response to electrical frame selection signals for moving the card which is in said selected position in the projection plane in the X direction in the projection plane to align a selected row of frames with the optical path portion between the condenser and the projection lens systems; and means operative in response to said electrical frame selection signals for moving the light source, the condenser and projection lens systems and the first mirror as a unit along said Y direction to align said beam with a selected column of frames, to thereby project on the screen a selected frame of the card which is in the selected position of the projection plane.

2. A microreader as in claim 1 including means responsive to the movement of the first mirror along the optical path to move each of the second and third mirror along the optical path by a distance corresponding to half the distance of movement of the first mirror, thereby maintaining the length of the optical path constant despite movement of the first mirror along the optical path.

3. A microreader as in claim 2 including means for selectively moving the first mirror along the optical path to thereby selectively change the length of the optical path and thus the magnification of the image projected onto the screen.

4. A microreader as in claim 3 including means for selectively moving the projection lens system along the optical path to thereby change the focusing of the image projected on the screen.

5. A system as in claim 4 including means for selectively rotating the projection lens system around the optical path traversing the projection lens system to thereby rotate the image projected onto the screen.

* * * * *